United States Patent [19]

Abboud et al.

[11] Patent Number: 5,664,319

[45] Date of Patent: Sep. 9, 1997

[54] MAGNETIC REINITIALIZATION OF THIN FILM MAGNETORESISTIVE REPRODUCING HEADS AT THE SUSPENSION LEVEL OF MEDIA DRIVE MANUFACTURING

[75] Inventors: Samir Elias Abboud, Hayward, Calif.; Nickolas Christopher Apuzzo, Rochester, Minn.; Jeffrey Bernard Brown, Rochester, Calif.; Earl Albert Cunningham, Rochester, Minn.; David Malcolm Hannon, Palo Alto, Calif.; Raymond Patrick Mallette, Shelburne, Vt.; Paul Sheldon Tyler; Steven Harry Voss, both of Rochester, Minn.; Albert John Wallash, Morgan Hill, Calif.

[73] Assignee: International Business Machines Corporation, Armonk, N.Y.

[21] Appl. No.: 471,505

[22] Filed: Jun. 6, 1995

Related U.S. Application Data

[63] Continuation of Ser. No. 129,293, Sep. 29, 1993, abandoned.

[51] Int. Cl.⁶ ............................................ G11B 5/127
[52] U.S. Cl. ............................................... 29/603.08
[58] Field of Search ........................ 29/603.03, 603.08, 29/603.04, 603.06

[56] References Cited

U.S. PATENT DOCUMENTS

| | | | |
|---|---|---|---|
| 2,834,938 | 5/1958 | Cunningham | 324/34 |
| 3,021,230 | 2/1962 | DeRiaud | 117/93 |
| 4,354,212 | 10/1982 | Nouchi et al. | 360/113 |
| 4,800,353 | 1/1989 | Csonka et al. | 335/210 |
| 4,939,837 | 7/1990 | Krounbi | 29/603 |
| 4,987,508 | 1/1991 | Smith | 360/113 |
| 5,220,474 | 6/1993 | Ohmori | 360/128 |
| 5,264,980 | 11/1993 | Mowry et al. | 360/113 |

FOREIGN PATENT DOCUMENTS 93201418  5/1993  European Pat. Off. .

OTHER PUBLICATIONS

Patent Abstracts of Japan, vol. 013, No. 502 (P–958), 13 Nov. 1989 & JP–A–01 201816 (Hitachi Ltd), 14 Aug. 1989, Abstract.
Patent Abstracts of Japan, vol. 013, No. 550 (P–972), 8 Dec. 1989 & JP–A–01 229414 (Sumitomo Metal Ind Ltd), 13 Sep. 1989, Abstract.
IBM Technical Disclosure Bulletin, vol. 26, No. 7A, Dec. 1983, Armonk, NY, US, pp. 3127–3128, XP002003949, Beam et al., "Self-aligned Two–step Process for Flux Enhancement in Magnetoresistive Sensors", p. 3128, paragraph 3.
Research Disclosure, No. 322, 1 Feb. 1991, p. 140 XP000169213 "Exciter for Testing File Memory Actuators".
Patent Abstracts of Japan vol. 013, No. 520 (P–963), 21 Nov. 1989 & JP–A–01 211314 (Matsushita Electric Ind Co Ltd), 24 Aug. 1989, abstract; Figure 3.
EP–A–0 572 067 (Philips Electronics NV) 1 Dec. 1993.
Review of Scientific Instruments, vol. 65, No. 2, 1 Feb. 1994, pp. 383–389, XP000439426 Thompson C.A. et al: "Micromagnetic Scanning Microprobe System" the whole document.
Patent Abstracts of Japan, vol. 012, No 166 (P–704), 19 May 1988 & JP–A–62 279509 (Alps Electric Co Ltd), 4 Dec. 1987, Abstract.
Patent Abstracts of Japan, vol. 014, No. 092 (P–1009), 20 Feb. 1990 & JP–A–01 300414 (Hitachi Ltd), 4 Dec. 1989, Abstract.
Patent Abstracts of Japan, vol. 008, No. 144 (P–284), 5 Jul. 1984 & JP–A–59 042625 (Fujitsu KK), 9 Mar. 1984, Abstract.
US–A–5 220 474 (Ohmori Shigeyuki) 15 Jun. 1993, Abstract.

*Primary Examiner*—Carl E. Hall
*Attorney, Agent, or Firm*—Terrance A. Meador; David A. Hall

[57] ABSTRACT

The magnetic states of MR reproducing heads are reinitialized during media drive manufacturing by applying initializing magnetic fields to the transducers after they have been manufactured and incorporated into media drive assemblies.

38 Claims, 13 Drawing Sheets

MAGNETIC REINITIALIZATION OF THIN FILM MAGNETORESISTIVE REPRODUCING HEADS AT THE SUSPENSION LEVEL OF MEDIA DRIVE MANUFACTURING

This application is a file wrapper continuation, of application Ser. No. 08/129,293, filed Sep. 29, 1993, now abandoned.

FIELD OF THE INVENTION

The present invention relates to the production of media drive assemblies which include a magnetoresistive (MR) head and, more particularly, relates to setting the magnetic state of a thin film magnetoresistive element during manufacture of drive assemblies.

BACKGROUND OF THE INVENTION

The prior art discloses magnetoresistive (MR) reproducing heads that operate based on the magnetoresistive effect exhibited by thin films composed of certain materials. A read head incorporating an MR transducer detects magnetic field signals through the resistance changes of an MR transducer element as a function of the amount and direction of the magnetic flux being sensed by the MR transducer element.

Responsive to the drive toward increased recording density, batch fabrication processes have been developed for efficient, high volume production of miniaturized MR transducers. Typically, a batch fabrication process for MR transducers employs known thin film manufacturing techniques to produce a plurality of such transducers on a wafer in "wafer level" processing. A wafer is then sliced row-wise into a 1×n array of transducers which are polished in "row-level" processing and then individuated by cutting rows into separate sliders. Each slider includes a head structure with an MR reproducing head.

It is known to selectively vary construction details and manufacturing parameters in order to yield an MR transducer having a particular magnetic state which optimizes transducer operation. In this regard, an MR transducer may comprise soft or hard biasing elements and may be produced by a batch process in which magnetic fields are applied at certain steps during wafer level processing. These components set magnetic characteristics of the thin film MR layer ("the MR stripe") such as magnetization direction, field orientation, and so on. See, for example, C. D. Mee et al, "MAGNETIC RECORDING, Vol. I", McGraw-Hill, New York, 1987, pp. 270–302.

The magnetic characteristics of the MR stripe are initialized by the application of a magnetic field to the MR head. Currently, the initialization step takes place at the wafer level and at the row level, depending upon the circumstances and requirements of manufacturing and assembly.

However, some processing operations that occur during and after row-level processing have been proved to alter the magnetic state of MR transducers. In this regard, the inventors have concluded that intentional and accidental insults to an MR transducer occurring during and after row level processing can cause the formation of domains in the thin film magnetoresistive material layer, alter the magnetic orientation of exchange layers in soft bias transducers, and disorient and demagnetize magnetized layers in hard bias transducers. Singly and collectively, these effects can alter the magnetic state of an MR transducer. The inventors have found that alteration of the magnetic state can significantly degrade the quality of MR transducer operation. Relatedly, MR transducers that exhibit high amplitude response during row-level testing can fall into low amplitude response after they are sliced from rows and mounted on media drive assemblies.

The prior art does not disclose a process for manufacturing media drives in which the magnetic state initially established for MR reproducing heads during wafer level processing is reinitialized during media drive assembly steps.

SUMMARY OF THE INVENTION

It is, therefore, the principal object of this invention to provide an apparatus and a procedure for reinitializing the magnetic state of MR reproducing heads following wafer and row level fabrication operations after the MR heads are incorporated in drive apparatus sub-unit assemblies.

In accordance with the invention, the magnetic state of an MR reproducing head is reinitialized by application of a magnetic field ("initializing field") after the MR head is mounted to a head suspension assembly (HSA) flexure.

The reinitialization apparatus and procedure of the invention use high energy magnets to provide an initializing field that is applied to MR reproducing heads at the HSA level. The initializing field is applied to an HSA-mounted MR reproducing head in a particular direction, usually parallel to the MR stripe and opposite to the direction of current through the stripe.

The foregoing and other objects, features, and advantages of the invention will be apparent from the following more particular description of the invention as illustrated in the accompanying drawings.

DETAILED DESCRIPTION OF THE PREFERRED EMBODIMENT

Figure 1:
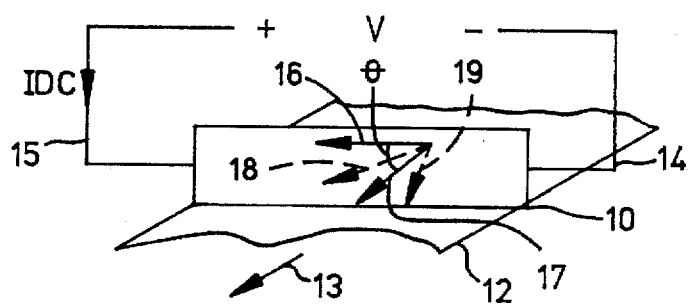
FIG. 1 is a schematic sketch showing a circuit including a magnetoresistive (MR) element for reading data from a magnetic medium.

FIG. 1 illustrates the response of a magnetoresistive stripe 10 to magnetic flux produced by moving a magnetized storage medium 12 transversely to the MR stripe 10 in the direction indicated by the arrow 13. As FIG. 1 shows, the MR stripe 10 has a planar structure that is oriented perpendicularly to the medium 12. Leads 14 and 15 connected to the MR stripe 10 conduct a constant DC current (IDC) through the stripe. As is known, the MR stripe 10 is a soft magnetic material having an initial magnetizing direction indicated by the arrow 16. For the MR stripe embodiment shown in FIG. 1, the magnetizing direction 16 is determined by the initial magnetic state of an MR transducer into which the MR stripe 10 is incorporated. In FIG. 1, the direction of magnetization happens to be opposite the direction of IDC. In other designs, the magnetizing direction may diverge from the current direction.

As is known, an MR head may include other features that bias the MR stripe 10. When the MR stripe is biased, the magnetization of the stripe assumes the direction indicated by the arrow 17 at an angle $\theta$ from the direction of the current.

In operation, the magnetic flux produced by moving the medium 12 in the direction 13 changes the magnetizing direction in the MR stripe 10 as indicated by the arrows 18 and 19, producing an angle $\pm\Delta\theta$ from the direction of magnetization. This, in turn produces a change in the stripe's resistivity. The change in resistivity has a known relationship with the change in $\theta$ and can be measured by the change in voltage V required to keep current IDC constant between the leads 14 and 15.

Figure 2:
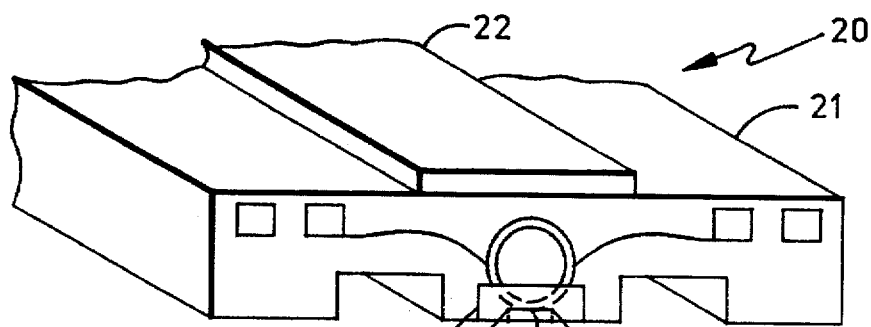
FIG. 2 is an isometric view showing a portion of the trailing end of a head suspension assembly (HSA) for a disk drive to which a slider with an MR reproducing head is mounted.

FIG. 2 is magnified isometric view showing the end of a head slider assembly (HSA) to which is mounted a head structure including MR reproducing head with an MR stripe. The view is toward the trailing end (TE) of the slider.

Conventionally, an HSA 20 manufactured for use in a disk drive includes a slider 21 mounted to a surface of a flexure 22. The slider 21 is manufactured using conventional batch processing techniques beginning with a ceramic wafer on which a plurality of head structures with MR reproducing heads are manufactured according to known techniques. (FIGS. 1 and 2 are not intended to limit the practice of the invention since the head structures may also incorporate thin-film write elements.) The wafer is then cut into rows and each row is sliced ("diced") into individual sliders, each with a head structure. In FIG. 2, the slider 21 includes a head structure with a MR reproducing head 24 that includes an MR transducer 25. A portion of the transducer is magnified in FIG. 2 and includes an MR stripe 26 having an initial magnetizing direction 28 that is determined in part by hard bias magnetic elements 27 and 29. The hard biased MR transducer structure of FIG. 2 is not intended to limit this invention. In fact, the MR transducer structure may be any whose initial magnetic state is predetermined by a selected combination of construction details and manufacturing parameters. The selected combination is intended to impose a particular magnetic state on the MR transducer, one characteristic of which is the magnetization direction.

THE INVENTION

The inventors have found that the operation of an MR transducer measured after HSA assembly can differ significantly from operation of the same transducer measured before and during row level processing. In fact, the inventors have found that up to two to three percent of MR transducers in a batch can exhibit a significant reduction in output from row to HSA level measurements. The invention results from the inventors' realization that such a decline in operation results from change in the magnetic states of the degraded transducers caused by various accidental and/or intentional insults to the MR transducers resulting from manufacturing and assembly operations up to the HSA level. The inventors have discovered that resetting or reinitializing the magnetic state of degraded MR transducers by application of an initializing field to the transducers after they are mounted to flexures can restore their magnetic states and recover their operations to levels measured at the end of wafer processing.

Figure 3:
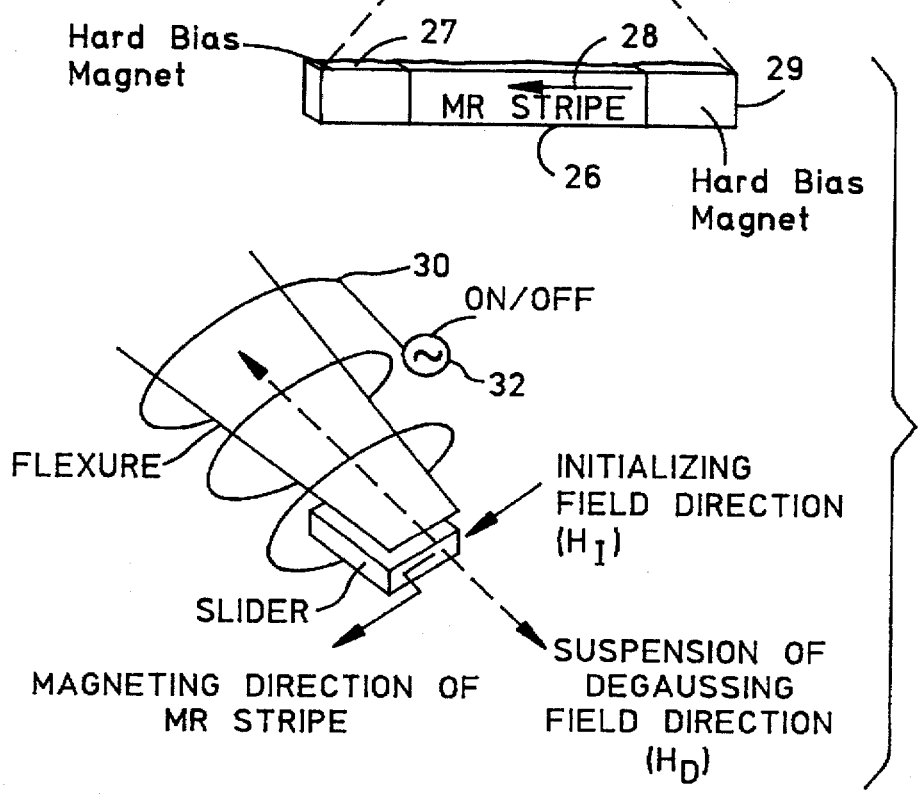
FIG. 3 is a diagram illustrating the application of an initializing field and a degaussing field to an HSA including an MR reproducing head.

Accordingly, the invention includes reinitialization of the magnetic state of an MR reproducing head by application of an initializing field as illustrated in FIG. 3 in a direction which is substantially parallel to the initial magnetizing direction of the MR stripe of an MR transducer on a flexure-mounted slider. In FIG. 3, the initializing field is indicated by $H_I$.

In the case where the flexure is made of a magnetic material, the inventors have realized that application of $H_I$ can leave a residual magnetic field in the flexure. Therefore, the inventors have provided for degaussing the flexure, when necessary, by application of a flexure degaussing field $H_D$ in a direction orthogonal to the magnetizing direction of the MR stripe by means of a degaussing coil 30 (illustrated diagrammatically in FIG. 3) which has applied to it a decaying AC voltage from an AC generator which can be switched on and off. The direction of the degaussing field is indicated in FIG. 3.

The strength of the initializing field $H_I$ must be of sufficient magnitude to influence the components of an MR transducer which essentially set the transducer's magnetic state. Relatedly, if the MR transducer is hard biased, the field strength of $H_I$ should be greater than the maximum coercivity field of the hardest magnetic material in the MR transducer. The inventors have found that a magnetic field having a strength in the range of 450 to 4500 gauss produces the desired effect in hard biased MR transducers over a range of designs using hard biased magnets. Further, the inventors have found that reinitialization at the HSA level of drive manufacture is advantageous since all thermal, electrical, and mechanical fabrication operations involving the MR transducers are completed prior to this stage of disk drive production. Also, most of the handling of the MR transducers will be completed.

In the disk drive manufacturing process employed by the assignee of this application, the manufacturing level at which sliders are mounted to flexures to produce head slider assemblies is called the "HSA level". In this manufacturing process, HSAs are typically processed in plastic trays which hold 20 HSAs in two adjacent rows of ten. In order to maintain the throughput of the disk drive manufacturing process, one significant challenge presented to the inventors was to perform the reinitialization process of the invention on as many HSAs simultaneously in a plastic tray as possible. (In this application, when HSAs are processed in a tray, "tray level" processing occurs.) Providing the high amplitude magnetic field in a limited space afforded in the tray resulted in the non-trivial tool configurations and implementations at the tray level.

Figure 4:
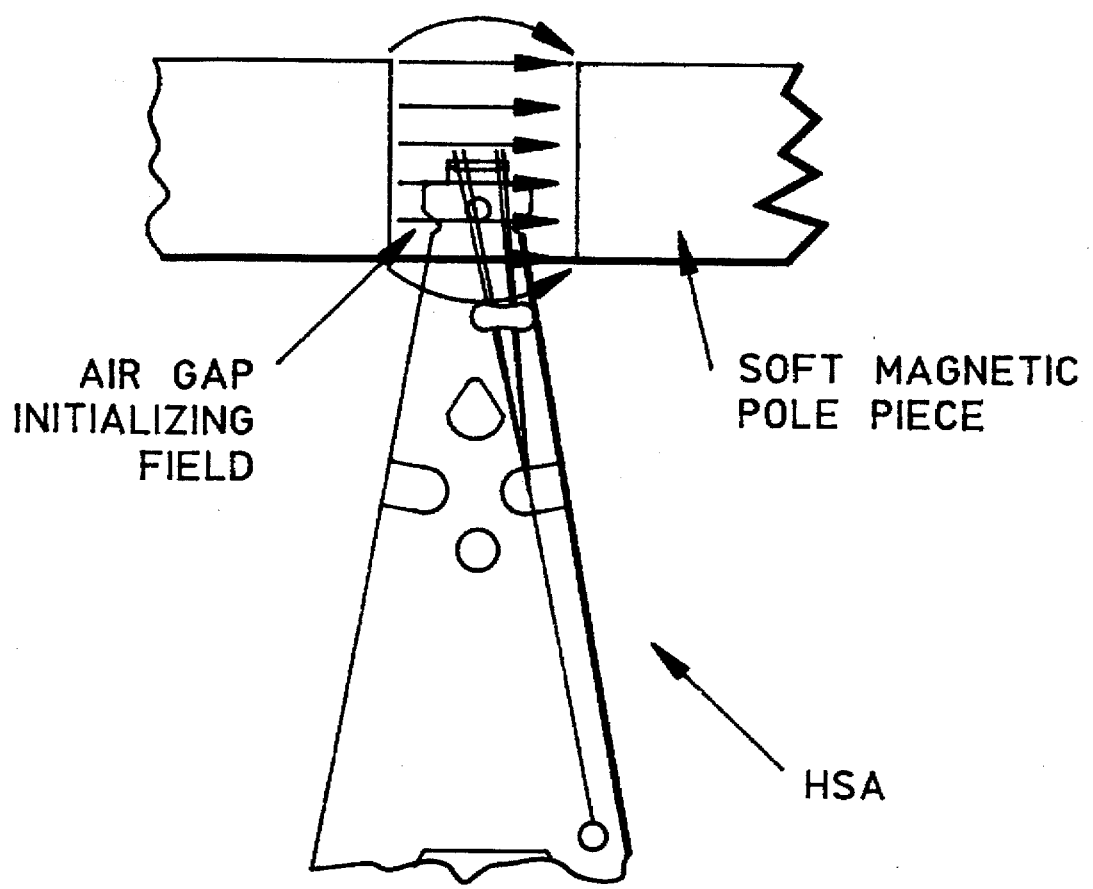
FIG. 4 is a top plan view showing reinitialization of the magnetic state of an HSA-mounted MR reproducing head according to the invention.

The tray level tool for reinitializing the magnetic state of MR transducers at the HSA level of disk drive manufacture is based upon a magnetizing apparatus shown in FIG. 4 which has a magnetizing space in the form of an air gap between a pair of soft magnetic pole pieces for receiving the trailing end of an HSA. An initializing field is induced in the air gap by the pole pieces. The air gap provides a well-defined region of space in which a uniform magnetic field may be created. The volume of the air gap between the faces of the pole pieces is dictated by the positioning of the MR stripe on the MR reproducing head within the manufacturing tray, the size of the trailing end of the HSA, and the amplitude and orientation tolerance of the initializing field.

Figures 5A, 5B:
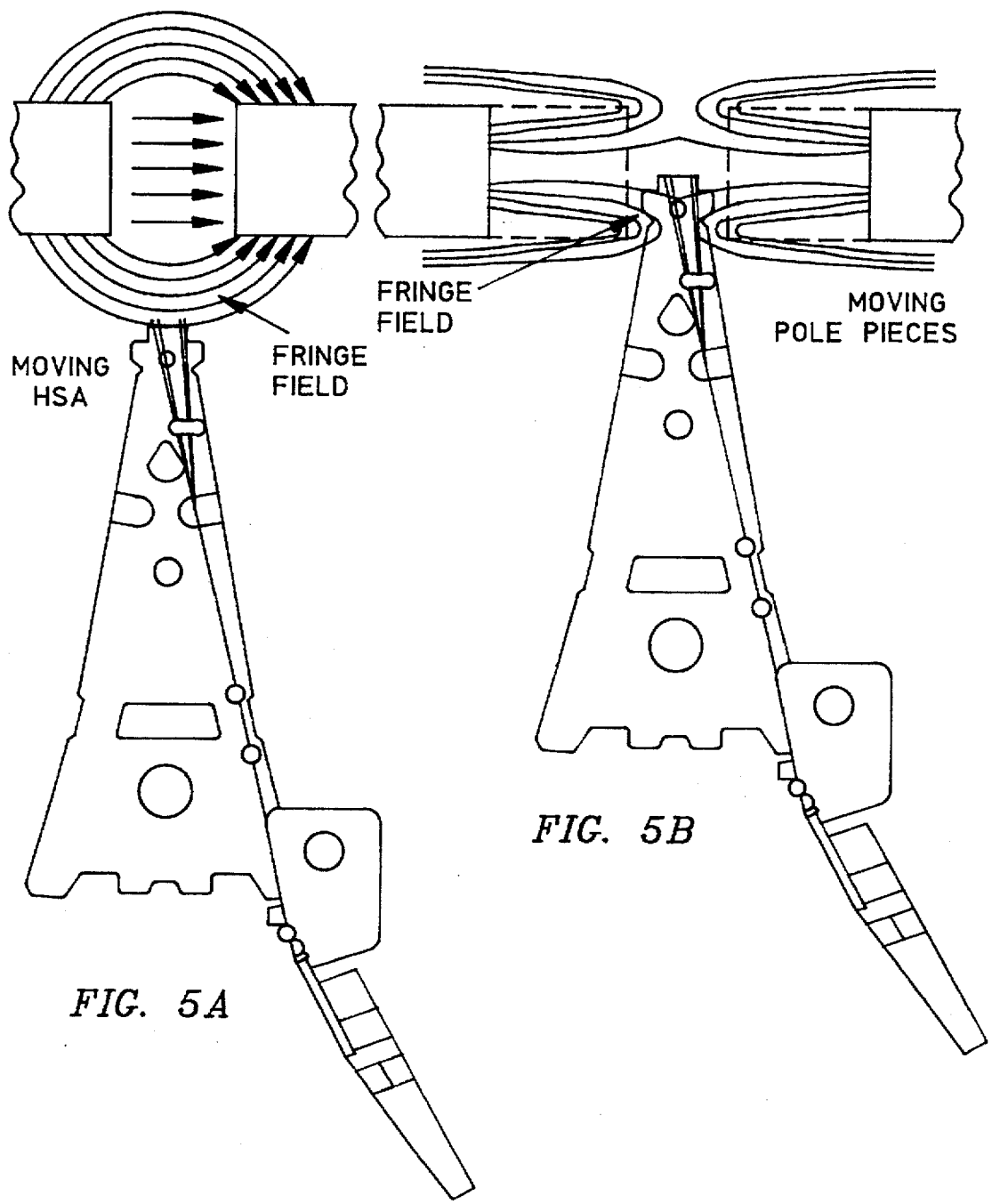
FIGS. 5A and 5B show relative movement between an initializing field and an HSA-mounted MR reproducing head.

FIGS. 5A and 5B illustrate suboptimal processes employing the magnetizing apparatus of FIG. 4. In this regard, if an MR reproducing head is moved into and extracted from the air gap region while the initializing field exists in the gap, it would traverse fringing fields which may inhibit the full effect of reinitialization at the HSA level. Separating the poles as illustrated in FIG. 5B while the MR transducer remains at the nominal center of the air gap can also result in non-uniformities produced by undesired fringing fields.

Figure 6A:
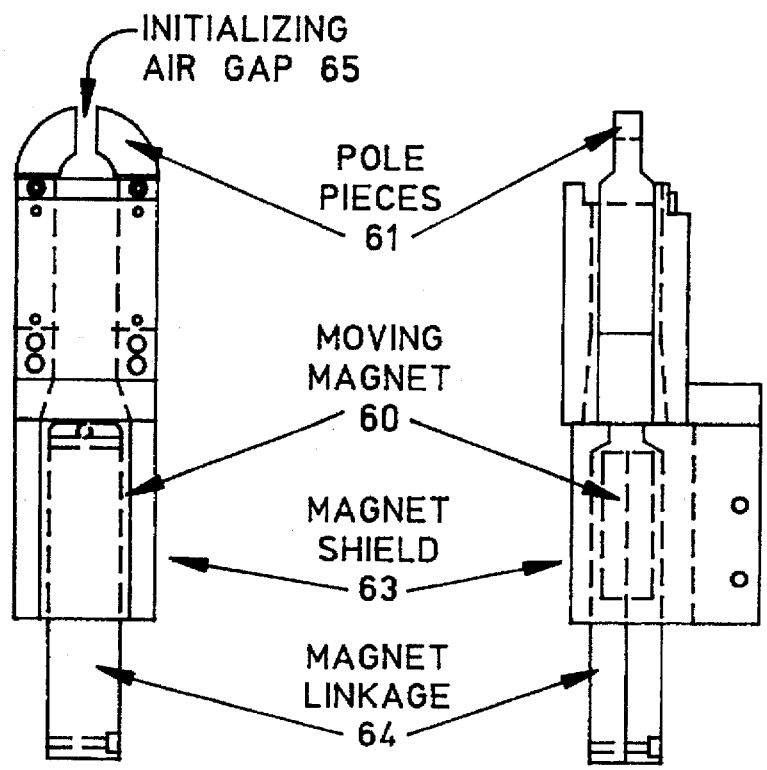
FIGS. 6A–6B illustrate a tool for applying an initializing field according to the invention.
Figure 6B:
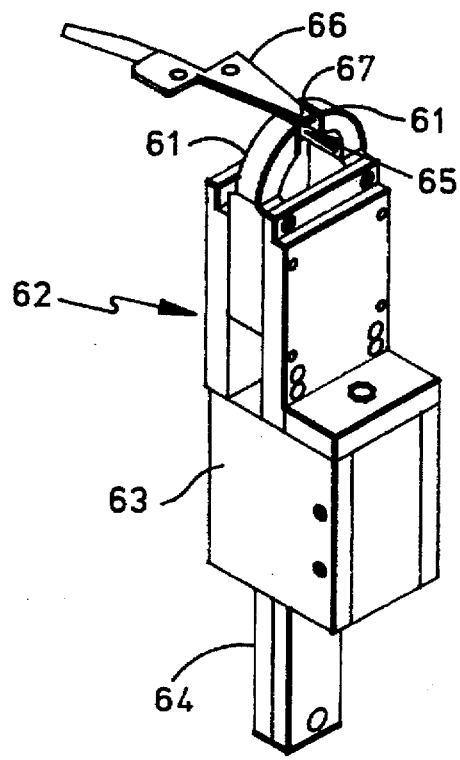

One novel way to reinitialize the magnetic state of an MR transducer according to the invention employs a permanent magnet which is inserted into and moved out of the magnetizing apparatus. This is shown in FIGS. 6A–6B where a moveable magnet 60 is slideably disposed with respect to two separated soft pole pieces 61 that are mounted in a pole housing 62. The pole pieces are made of soft magnetic material and the housing defines a first position between the pole pieces 61 to which the moving magnet 60 can be moved. When the moving magnet 60 is in the first position, the soft pole pieces 61 channel the flux of the magnet's magnetic field to the air gap region 65. The moving magnet 60 can also be moved to a second position within a magnetic shield 63 made of a soft magnetic material which confines the magnetic field of the moving magnet 60 when the magnet is at the second position. At the second position, little or none of the magnet's field reaches the soft pole pieces 61. The moving magnet 60 is coupled to a magnet linkage 64 provided for mechanically coupling the magnet 60 to a conventional two-stroke electro-mechanical device such as a solenoid that can be incorporated into an automated production line.

As shown in FIGS. 6A–6B, an HSA 66 with an MR transducer mounted to its trailing end 67 can be placed in the air gap 65 while the magnet is in the second position. Following location of the MR transducer in the air gap 65, the magnet 60 is moved to the first position at which its field is channeled into the air gap to reinitialize the magnetic state of the MR transducer. Next, the magnet is moved to the second position and the HSA and the pole pieces are separated. Thus, the field in the air gap changes only in magnitude, from zero when the magnet 60 is at the second position, to maximum when the magnet 60 is at the first position and from maximum to zero when the magnet is moved back to the second position. The movement of the MR transducer across fringe fields is avoided, resulting in an optimum reinitialization of the magnetic state of the MR transducer.

The magnetizing apparatus illustrated in FIGS. 6A–6B is also called a "cell". Preferably, the pole pieces of the cell are constructed from a soft magnetic material exhibiting no significant coercivity that responds to the field of moving magnet 60 but exhibits no significant residual field when the magnet 60 is in the second position. The opposing faces of the pole pieces 61 localize the initializing magnetic field to the trailing edge 67 of the HSA and avoid bathing the entire flexure of the HSA 66 in a magnetic field. The magnetic shield is preferably formed from the soft magnetic material of the pole pieces.

Figures 7A, 7B, 7C:
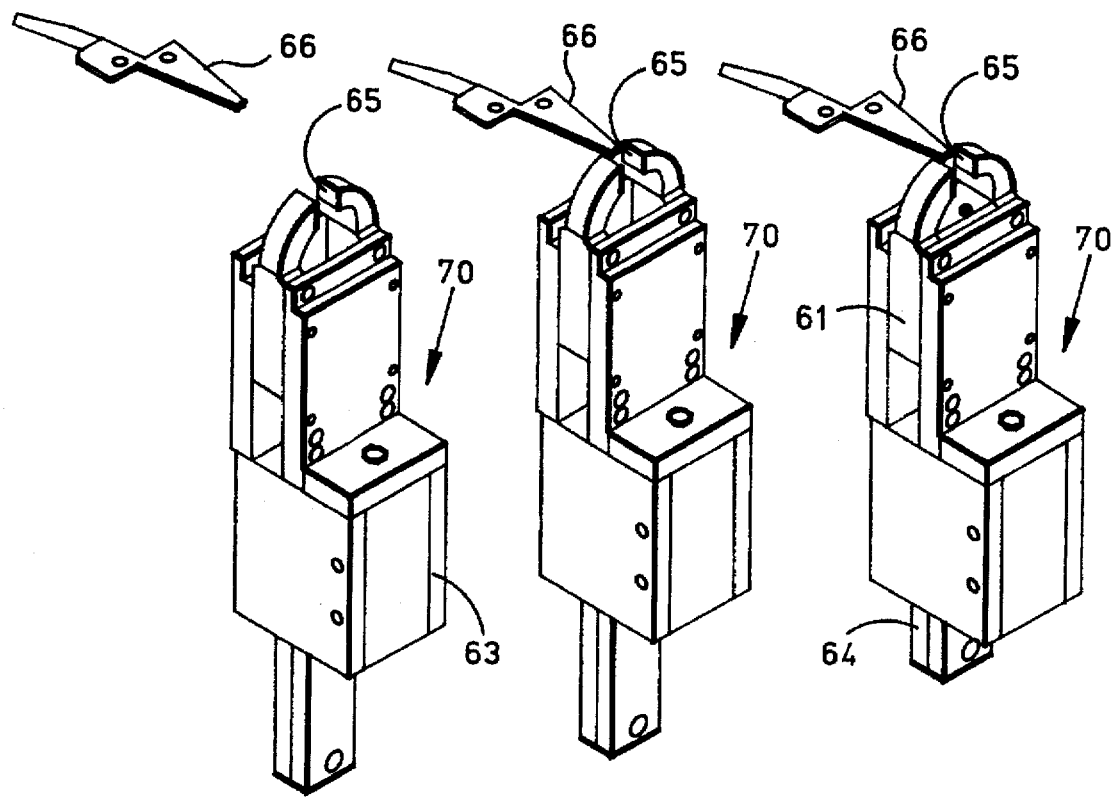
FIGS. 7A–7E show use of the tool illustrated in FIGS. 6A and 6B.
Figures 7D, 7E:
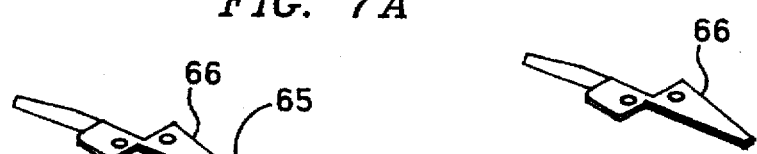

FIGS. 7A–7E show the process of the invention using a single cell 70. In FIG. 7A, the moving magnet initially resides in the magnetic shield 63. Hence, no field exists in the air gap 65. In this state, the cell 70 is moved (or the HSA 66 is moved) to place the trailing end and the MR transducer into position as illustrated in FIG. 7B. In this position, the nominal center of the air gap is aligned with respect to the magnetizing direction of an MR stripe in the MR transducer. Following movement of the cell (or HSA) to the position illustrated in FIG. 7B, the moving magnet 60 is moved by way of the magnet linkage 64 to the first position between the pole pieces 61 as shown in FIG. 7C. A high amplitude initializing field is thus produced in the air gap 65 and reinitialization of the magnetic state of the MR transducer is achieved. The magnet is then returned to its second position in the magnetic shield 63 .as shown in FIG. 7D and the field in the gap correspondingly falls toward zero. Finally, the cell and HSA are separated as shown in FIG. 7E.

The inventors have observed that placement of the moving magnet 60 into the first position between the pole pieces 61 directly controls the field strength in the air gap 65. Therefore, the field strength of the cell is adjustable and requires only a mechanical stroke-limiting feature to provide for varying desired field levels. Alternatively, the inventors contemplate that the moving magnet 60 can be replaced by a stationary electro-magnet which can be operated in either constant or pulse mode at the cost of space required for coils and provision of a voltage source.

It should be understood that the five step procedure of FIGS. 7A–7E produces the optimum results when the HSA is moved in and out of the air gap without a magnetic field being induced. This avoids the potential undesirable effects explained above with reference to FIGS. 5A and 5B. However, the inventors contemplate that the invention may be practiced, when circumstances allow, by maintaining the magnetic field while the HSA is moved into and out of the air gap.

As can be appreciated by those skilled in the art, a single cell magnetizing apparatus can be employed to reinitialize a set of HSAs, one by one, by incorporation into a station employing a robotic positioner. This would not limit processing according to the invention to tray level. Of course, a manually operated cell could also be implemented.

Figure 8:
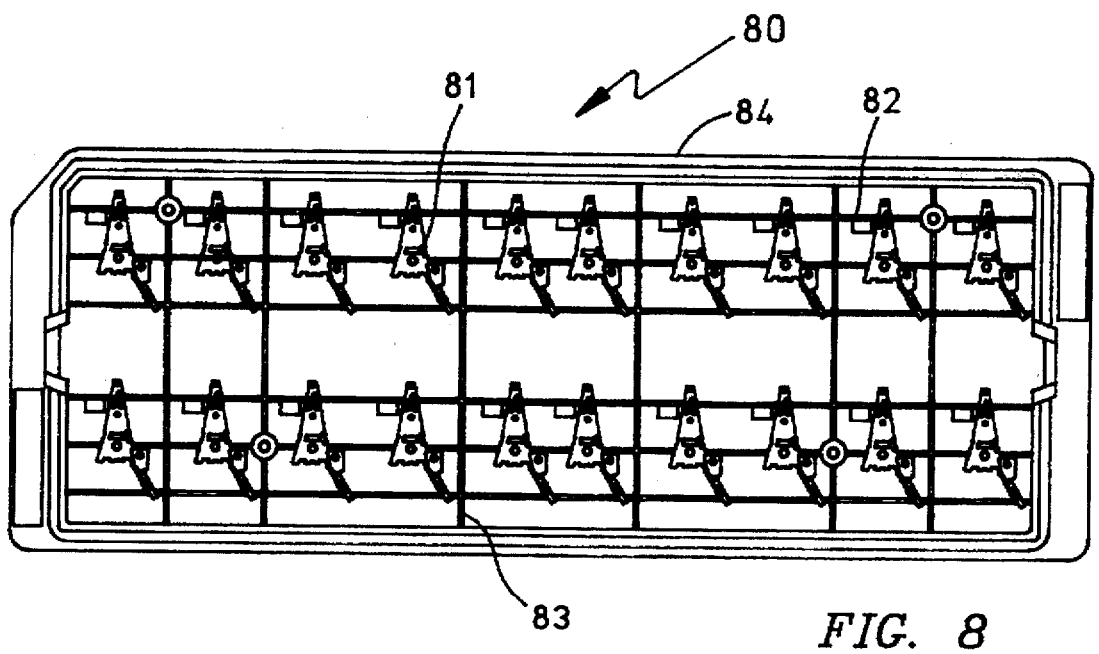
FIG. 8 illustrates a tray for holding a plurality of HSAs.

FIG. 8 illustrates the disposition of the 20 HSAs for tray-level processing. In this regard, a tray 80 provides mounting support for tray-level processing to 20 HSAs, one of which is indicated by reference numeral 81. The tray 80 includes a plurality of horizontal support members, one of which is indicated by reference numeral 82, and a plurality of vertical cross pieces, one Of which is indicated by reference numeral 83. The support members, cross pieces, and HSAs are enclosed in a tray periphery 84. The support members, cross pieces, and periphery are co-planar, the tray having no bottom or top surface. Consequently, the trailing ends of the HSAs are accessible from either side of the tray 80. As FIG. 8 shows, the tray 80 permits a plurality of small HSAs to be placed adjacently in a predetermined orientation and permits insertion of pole pieces into the tray.

Figure 9A:
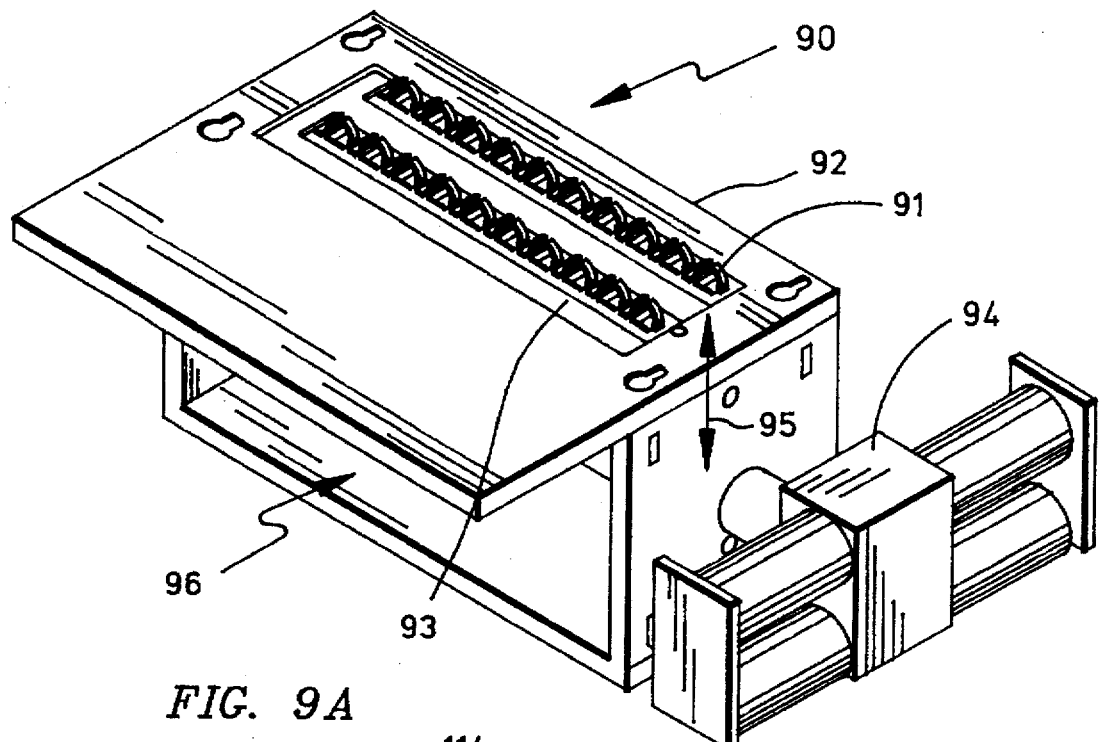
FIGS. 9A and 9B illustrate a first manufacturing tool for performing multiple concurrent reinitializations according to the invention.
Figure 9B:
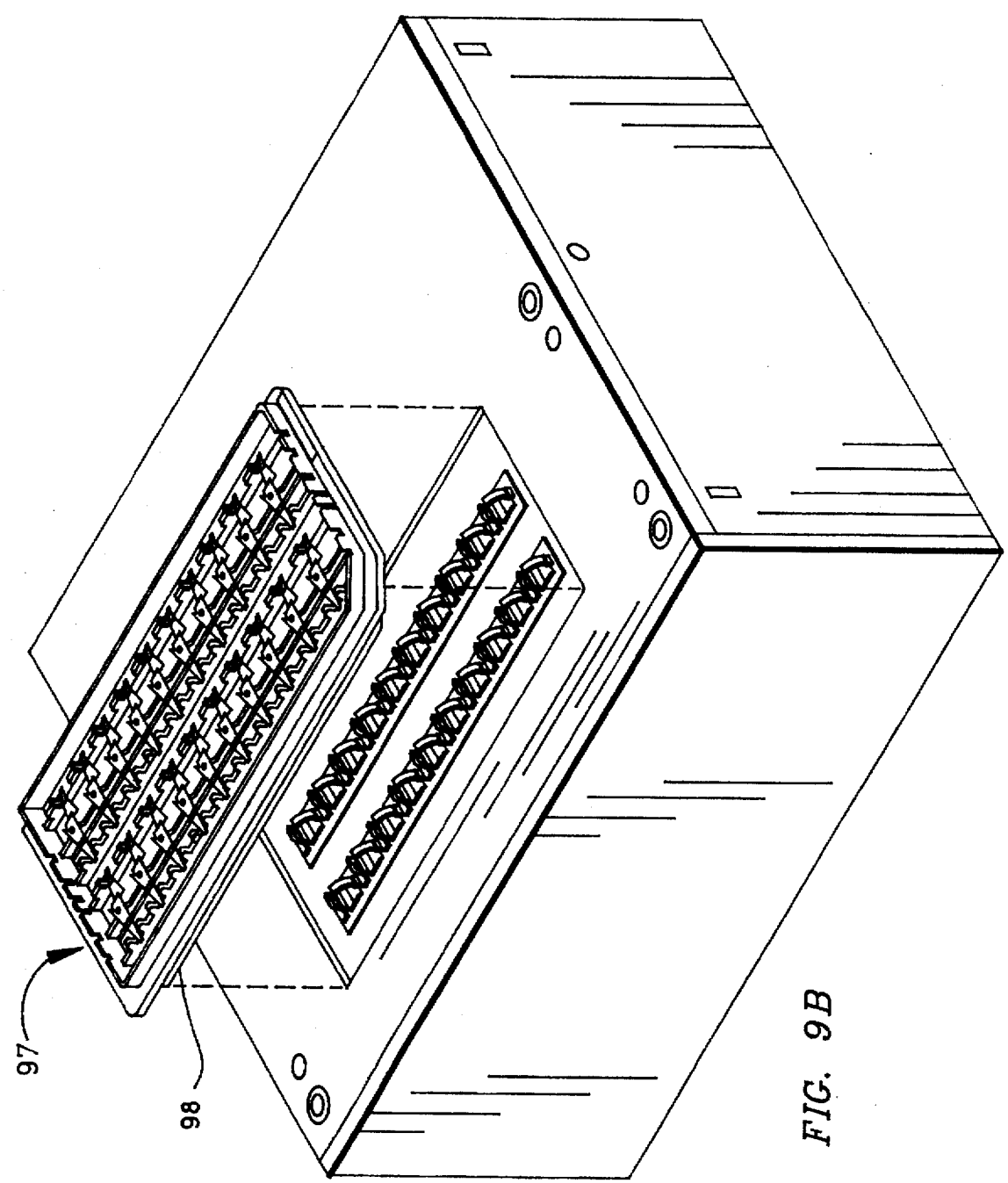

FIGS. 9A and 9B show a tray level machine 90 with a plurality of cells 91 in alignment with a plate 92 having a recess 93 for receiving a tray. As shown in FIG. 9A, the cells 91 are mounted in 1×10 arrays. The arrays are co-mounted on a moveable member (not shown) which is driven by a multi-stroke drive 94 in the two directions indicated by the arrow 95. When driven downwardly, the arrays are pulled down into the interior of the tray level machine 90. When driven upwardly, the cell arrays are moved to the position shown in FIG. 9A where the pole pieces protrude upwardly within the space defined by the recess 93. As FIG. 9B shows, a tray 97 with 20 HSAs mounted therein includes a lower lip 98 that engages the outer periphery of the recess 93 to align the tray with the recess so that when the cell arrays are driven upwardly into the recess, each cell air gap aligns precisely with the trailing end of a respective HSA to perform the reinitialization step concurrently on all of the HSAs. The reinitialization is performed when the multi-stroke drive 94 moves the magnets of the cells upwardly between the pole pieces to induce the initializing fields in the air gaps. Next, the multi-stroke drive 94 pulls the magnets down into the cell shields and then pulls the cell arrays downwardly into the tray level machine 90. The tray 97 is then extracted from the recess 93.

Figure 10:
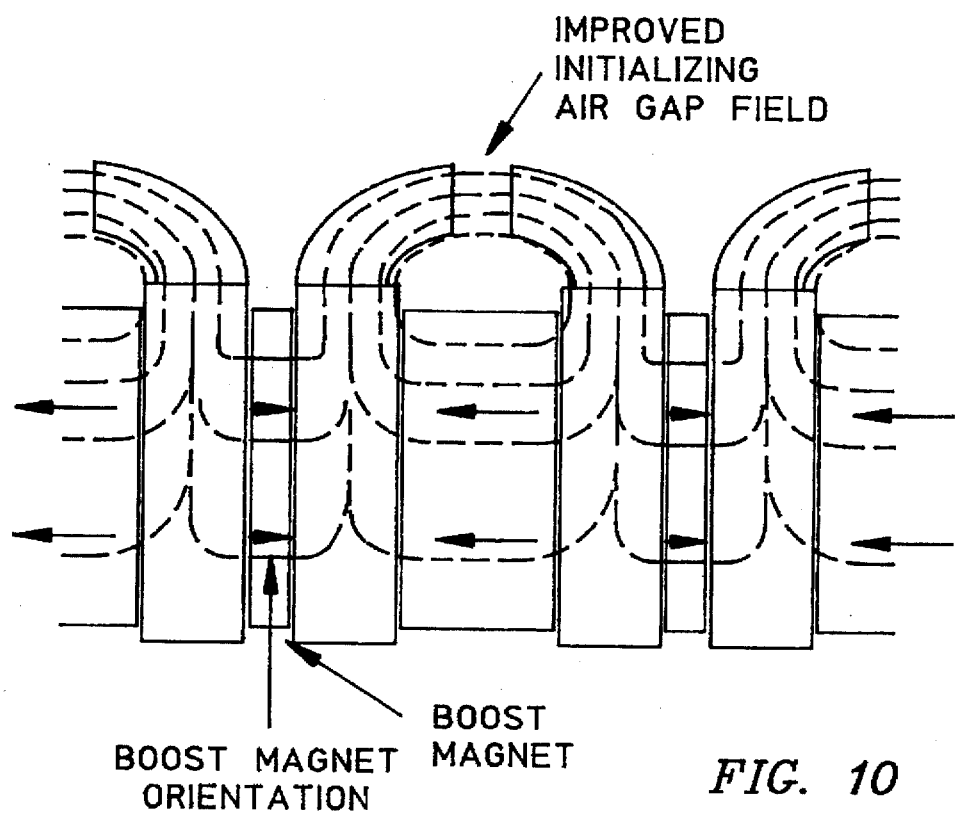
FIG. 10 is a schematic diagram illustrating the suppression of field leakage between adjacent reinitializing cells.

If the initialization cells in the machine illustrated in FIGS. 9A and 9B are compact and placed adjacently, then it is possible to simultaneously insert twenty air gaps into the tray and to concurrently initialize the magnetic states of the MR transducers mounted on all of HSAs mounted in the tray. However, undesired field leakage between adjacent cells may cause the magnetic field in any air gap to decrease markedly. In some applications, resetting the magnetic state of MR transducers may require low magnetic field strength, and for this strength, the field of adjacent cell leakage does not degrade the gap field strength to an unacceptable level. However, in other cases, leakage may prevent the field from achieving acceptable levels required for initialization. To counteract the degradation in field strength in air gaps due to a adjacent cell leakage, "boost" permanent magnets may be added between the pole pieces of adjacent cells as shown in FIG. 10. The boost magnets and cell magnets together provide a high magnetic field in each gap. The boost magnets may be coupled into the linkage which moves the cell magnets and, thus, may be moved in tandem with them.

Alternately, the boost magnets may be eliminated if cells are spaced at relatively greater distances. However, this may decrease the number of HSAs that may be processed per magnet stroke. This also requires shields to protect heads initialized during a first pass from being affected adversely by a second pass when two passes are made on HSAs mounted in a single tray.

Figure 11A:
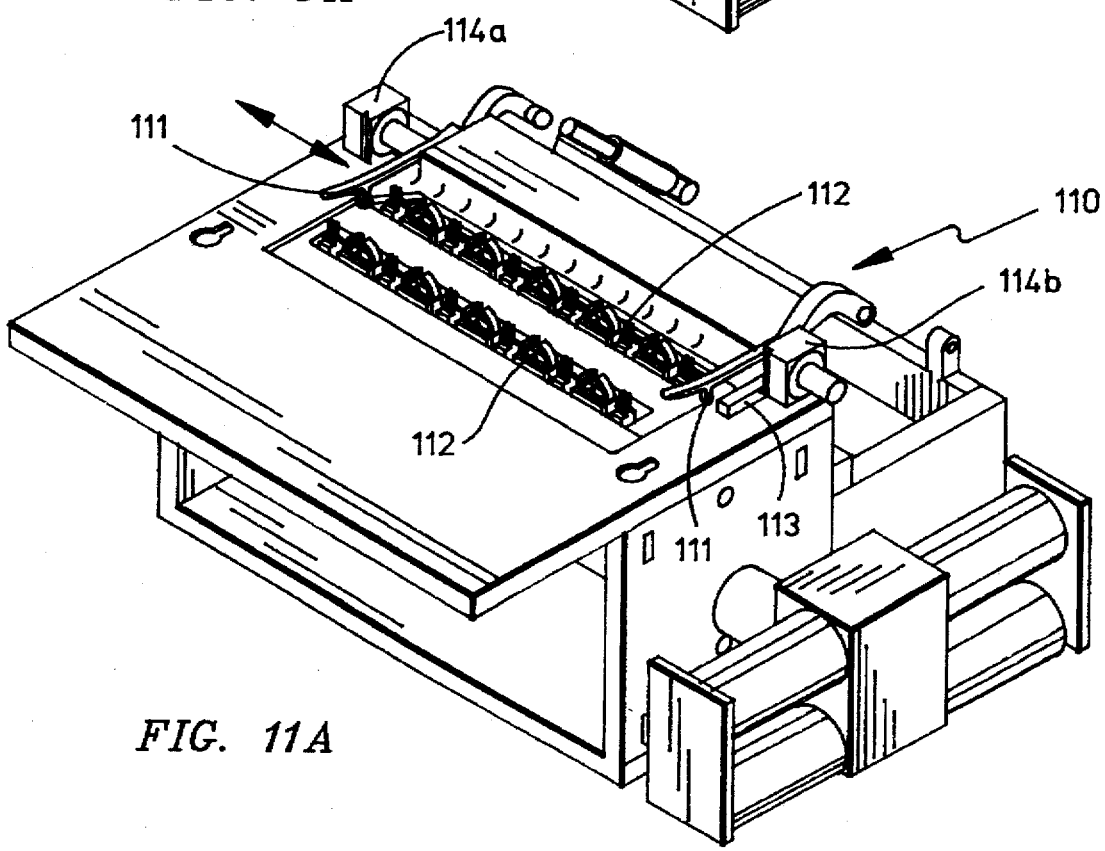
FIGS. 11A and 11B illustrate a second manufacturing tool for performing multiple concurrent reinitializations according to the invention.
Figure 11B:
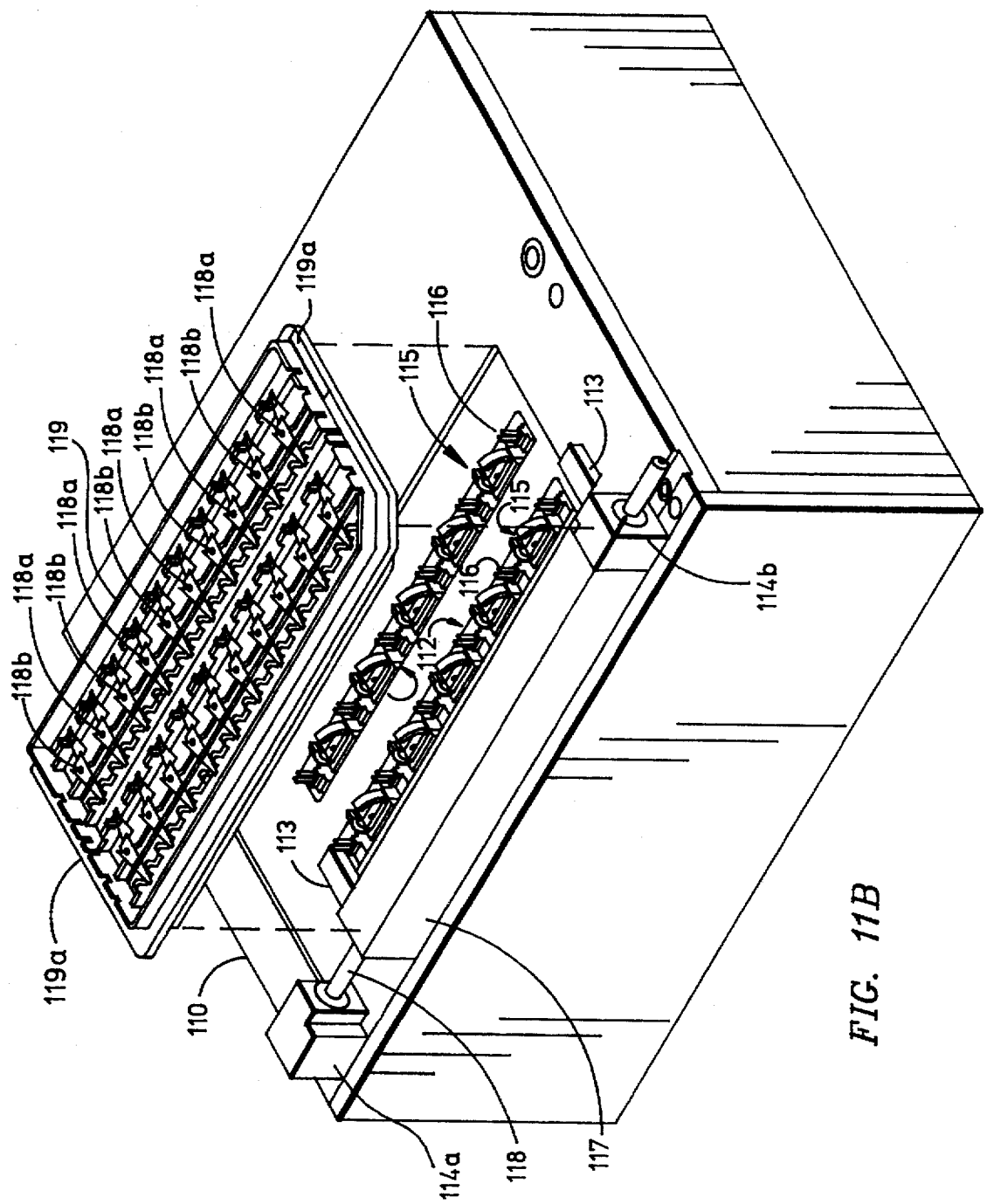

FIGS. 11A and 11B show an embodiment of a tray level machine 110 in which cells are spaced at relatively greater distances than those illustrated in the tray level machine 90 of FIGS. 9A and 9B. The tray level machine 110 includes a recess between two thumbs 111a within which the tray 119 is moved between two positions. The tray 119 includes tabs 119a in its periphery. The tabs 119a are engaged by the thumbs which are mounted on pivoting extensions 111b. The tray 119 is engaged in a tray holder frame 117 that includes extensions 113 for engaging the lower lip of the tray 119. The tray holder frame 117 is moveable on the shaft 118 between two positions. At a first position, with the tray indexed to the left, five HSAs in each row of the tray 119 are positioned for reinitialization by five cells in each of the cell arrays 112. As seen best in FIG. 11B, each cell array includes five cells 115 and six shields 116. Thus, in the first position of the tray 119, five HSAs in each tray row are reinitialized by initializing fields generating in five corresponding cells of each cell array 112. For example, at the first position of the tray 119, the five HSAs denoted by reference numeral 118a in the back row of the tray 119 and the corresponding five HSAs in the front row of the tray will have their trailing ends positioned in cell air gaps for reinitialization. At the first position, while the first ten HSAs are being reinitialized, the second ten HSAs, including all of those in the back row denoted by reference numeral 118b and the corresponding ones in the front row will have their trailing ends shielded by the shields 116 of the two cell arrays. In the second position, the tray 119 will be indexed to the right so that the five HSAs denoted by reference numeral 118a in the back row of the tray 119 and the corresponding five HSAs in the front row of the tray will have their trailing ends shielded, while the remaining ten HSAs including the five denoted by 118b in the back row and the corresponding five in the front row of the tray 119 will be positioned for reinitialization by the ten cells.

Figure 12:
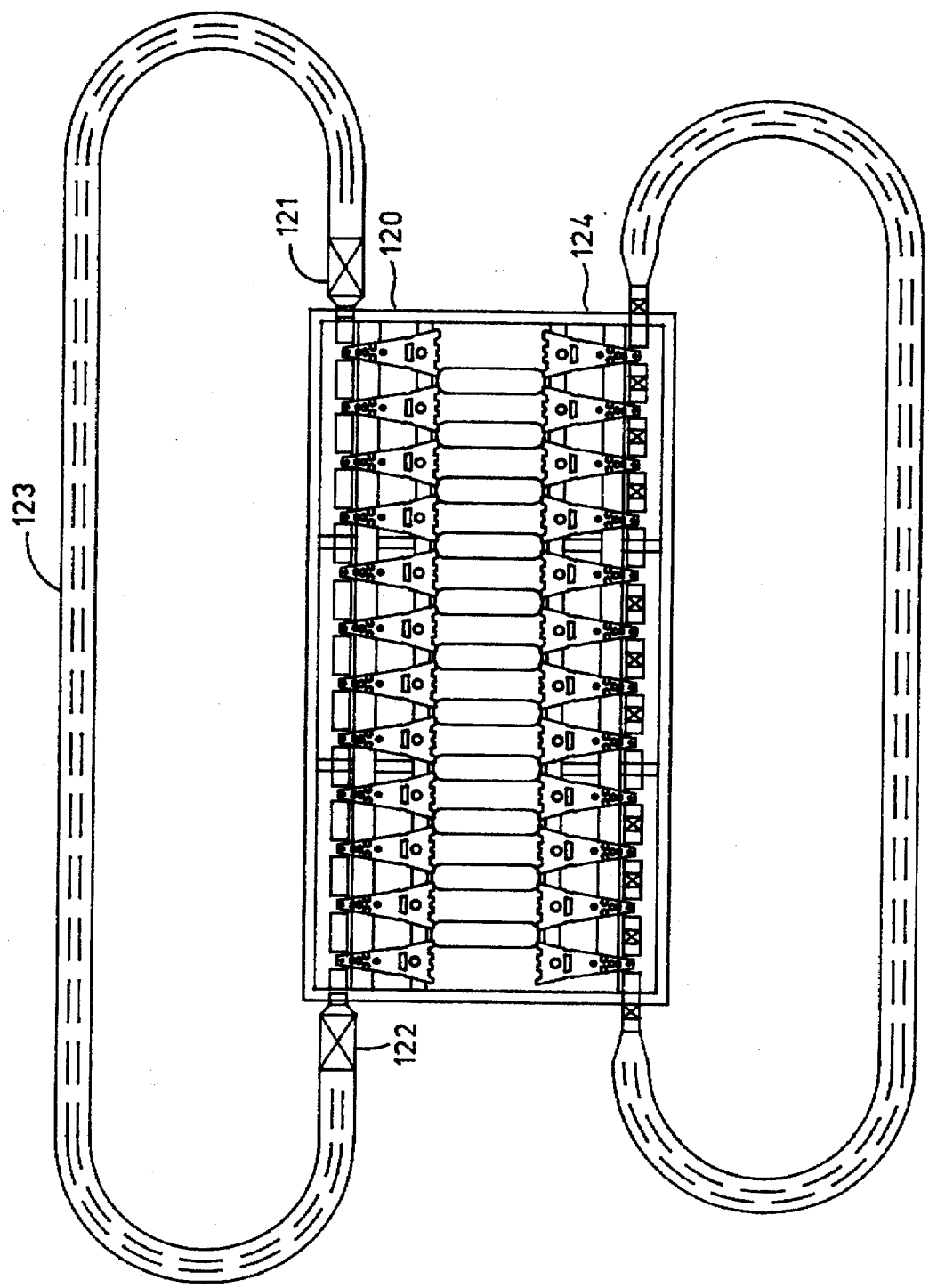
FIG. 12 is schematic diagram illustrating two magnetic circuits, each for performing multiple concurrent reinitialization on a plurality of HSAs during described manufacturing.

FIG. 12 shows two embodiments of a tray level magnetic circuit, either of which may be used to practice the invention. In the circuit denoted by reference numeral 120, soft material pole pieces are placed between HSAs to channel magnetic flux across the trailing ends of the assemblies in a substantially uniform manner. Permanent magnets 121 and 122 attach to a soft magnetic return path 123 provide closure to the magnetizing circuit. The pole pieces are moved into place in a stroke to align the gap centers with the MR transducers. Then, the magnets and return path are moved into alignment with the pole pieces and reinitialization occurs. The magnets and the return path are then removed, followed by removal of the pole pieces. The embodiment indicated by reference numeral 124 also includes a series magnetic circuit. However, instead of the large end magnets 121 and 122 of the first embodiment, the magnets used are smaller and are distributed between the pole pieces.

Various considerations that affect the industrial application of the invention may lead to selection of a reinitialization magnetizing tool different from that illustrated and described previously. For example, it was pointed out that the inventors contemplate the use of a stationary electromagnetic for generation of the reinitialization field. It is conceded that a significant advantage of the permanent magnet tool stems from the fact that when the moving magnet is moved from the first to second position, the large air gap of the tool presents a large reluctance that significantly reduces any residual fields in the soft magnetic material of the pole pieces. With a conventional electro-magnet design, coil turns would be wound on a solid C-shaped core, one or more HSAs would be placed in the gap formed by the core and the current would be applied to the coil turns to induce a magnetic field in the gap. With removal of the current, the solid C-shaped core would act continue to act as a low strength horseshoe magnet due to the coercivity of the pole material. Provision of a large air gap in the electro-magnetic core would curtail the high field strength capability of the design.

Figure 13A:
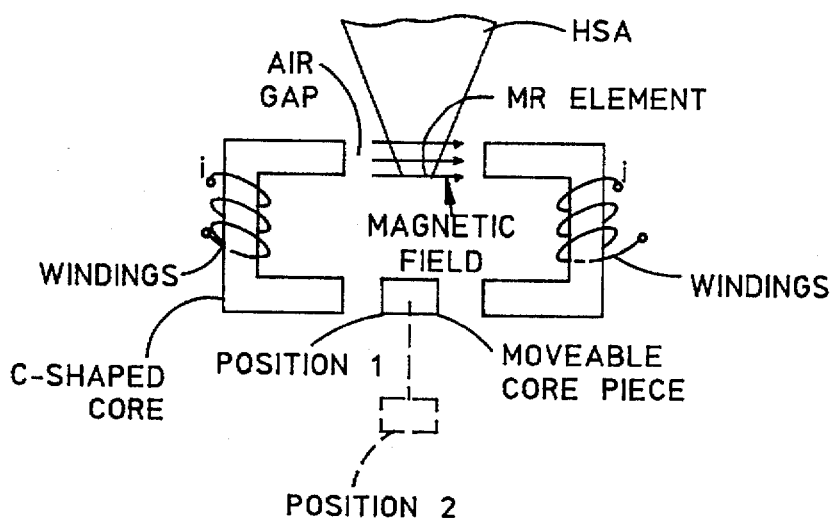
FIGS. 13A and 13B illustrate alternative tools for performing reinitialization according to the invention.

One design which permits use of an electro-magnet with a reasonably small air gap is shown in FIG. 13A. In this configuration, the electro-magnet has a movable anti-residual field core piece that is moved to a first position just prior to energization of the electro-magnet to the second position when the electro-magnet is turned off. With the core piece in the first position, one or more HSAs are placed in the air gap, the current is applied and then turned off, and the movable core piece is moved to the second position, reducing the residual field and permitting removal of the HSAs. Alternatively, after the current is applied to the coil turns and the reinitializing field is induced in the air gap, the residual field can be reduced or substantially suppressed by provision of a small reverse current to the coil turns to counter the remnant field.

Figure 13B:
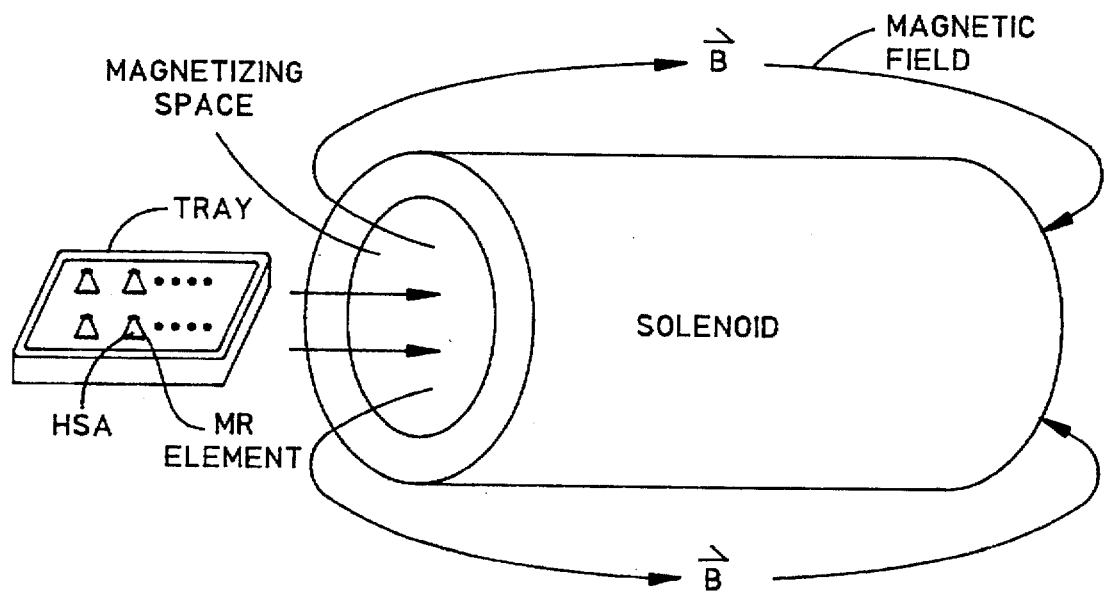

A third alternative for practicing the invention is schematically illustrated in FIG. 13B in the form of a large solenoid. The solenoid can comprise a cylinder of coil turns which are either self-supporting or wrapped on a support. The interior of the solenoid forms a magnetizing space which can receive a tray of HSAs. The tray of HSAs is placed within the magnetizing space. Application of a current to the coil turns conventionally induces a magnetic field that extends into the magnetizing space within the cylinder where the HSAs are located, thereby initializing their MR elements.

Figure 14:
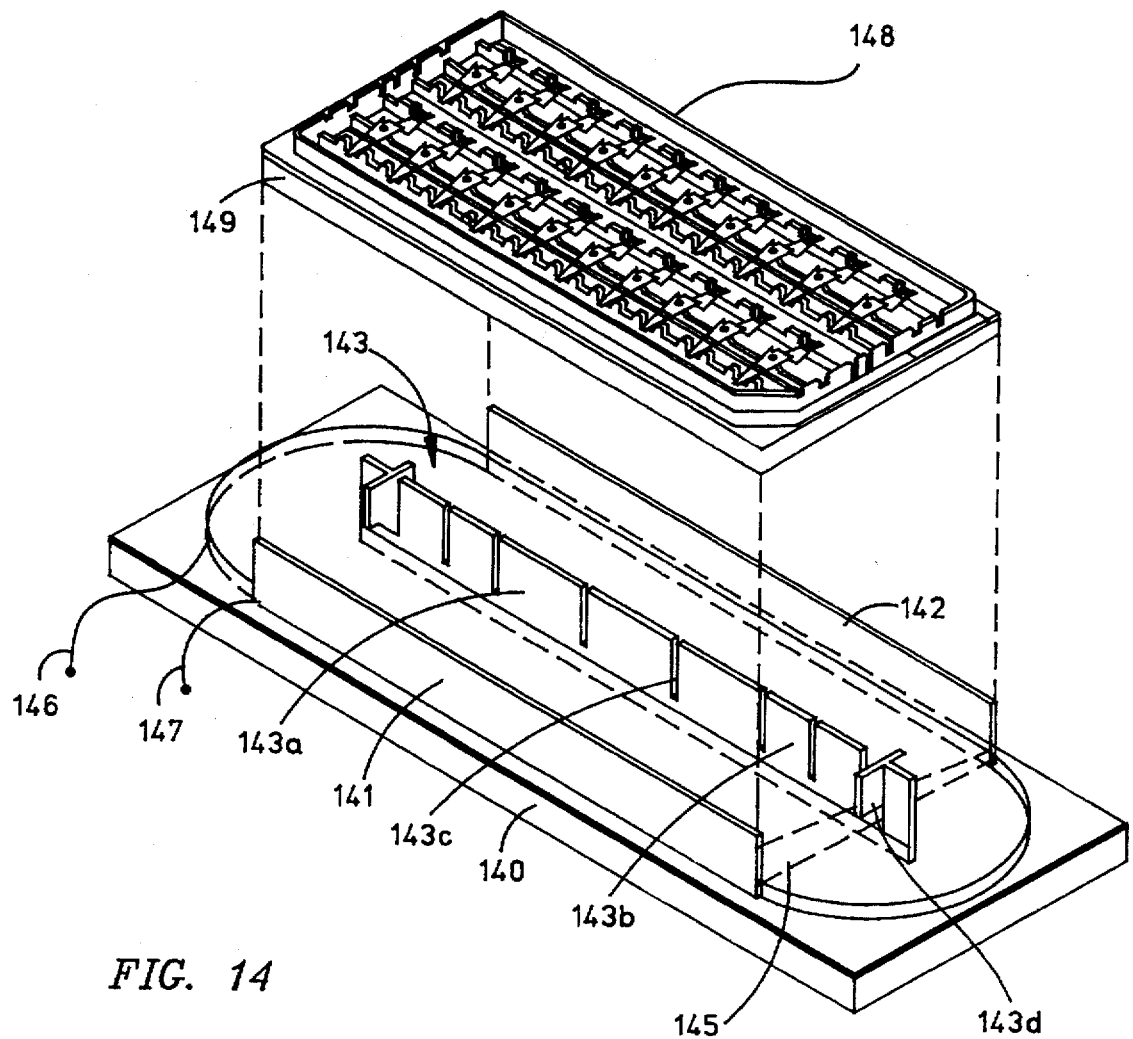
FIG. 14 illustrates the manufacturing tool for performing multiple concurrent demagnetizations of HSAs after reinitialization.

FIG. 14 shows a tray level degaussing tool that simultaneously degausses the suspensions of twenty HSAs. This is required if the stray field from a magnetized suspension produces unwanted effects such as disturbance of the bias level of a mounted MR element, or collection of unwanted magnetic particles near the MR element.

The degaussing tool includes a core made of soft magnetic material. The core includes a base 140, an outer pole 141, a second outer pole 142, and a central pole 143. The central pole includes three wide tabs 143a, four relatively narrow tabs 143b, and slots 143c.

In order to form an electro-magnet, a coil 145 is wound around the central pole 143. The coil has connecting wires 146 and 147 used to connect to a source of alternative voltage (not shown). The source applies the alternating voltage which is then slowly reduced in amplitude to provide the appropriate degaussing field.

A tray 148 with twenty HSAs is placed on a non-magnetic tilted support 149 having a long slot (not shown) to pass over all tabs of the central pole 143. The cross pieces of the tray, one of which was previously illustrated by reference numeral in FIG. 8, pass into the slots 143c of the central pole 143. Mechanical guides (not shown) are used to lower the tray into the pole structure of the degaussing tool and to support it therein.

When the tray 148 is inserted, there are two HSAs on each side of the three wide tabs 143a of the central pole 143. There is one HSA on each side of the four smaller tabs 143b in the central pole 143. End portions 143d of the central pole extend outside the tray, and are structured to prevent loss of field strength on the HSAs at the ends of the rows, and to keep the field directions substantially perpendicular between the central and outer poles, even at the positions of the outer HSAs. The tilting of the support 149 is formed to compensate for the angle that the HSAs lay in the tray, such that the fields will be along the longitudinal direction of the sliders.

When alternating current is applied between 146 and 147, magnetic flux is pushed into the central pole 143. Half of the flux leaves the central pole and flows toward the outer pole 141, while the other half flows backward to the outer pole 142. The central pole 143 has a higher vertical extent than the outer poles to provide the flux which goes over the outer poles to their outer edges. This allows the field strength at the inner surfaces of the outer poles to be nearly equal to that on the outer surfaces of the central pole.

The provision of the two outer poles makes use of both sides of the race track coil and uses half of the amp-turns of a simple U-shaped electro-magnet across the pole tray width. The use of the two outer poles also causes the field strength to fall off rapidly outside of the tool's vicinity, preventing interaction with other nearby devices.

When the alternating degaussing current is ramped down to zero, the support 149 and the tray 148 are raised, and the next tray is placed on the support and the process is repeated.

Figure 15:
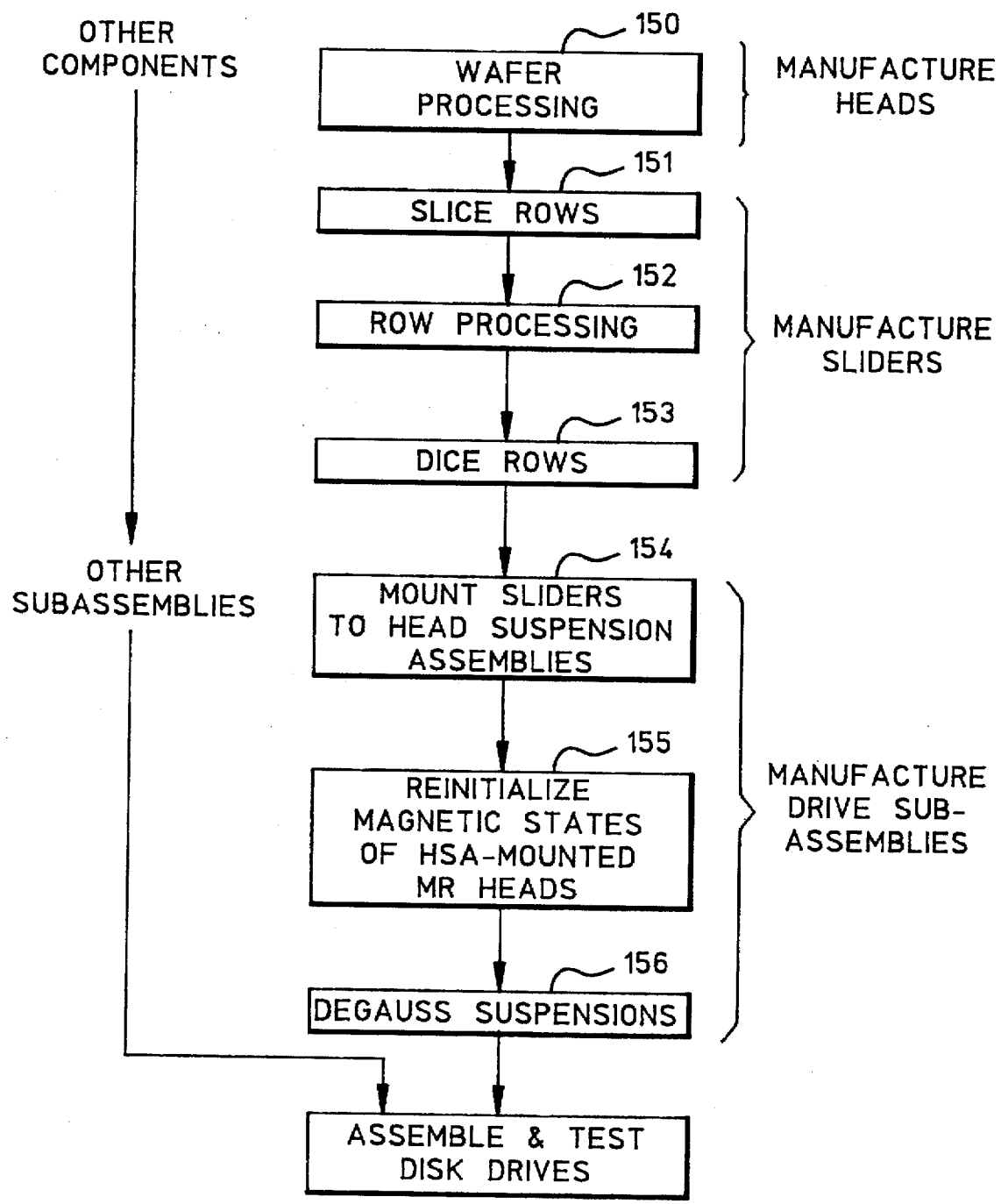
FIG. 15 is a flow diagram illustrating a disk drive manufacturing process including an MR head magnetic reinitialization step.

FIG. 15 is a flow diagram illustrating the steps of a manufacturing process for disk drives which incorporates a reinitialization step that may be performed by any of the single or multiple cell embodiments illustrated and described above. Initially, components including disks and head assembles are manufactured. Head assemblies including MR reproducing heads are manufactured on a single wafer using known methods. Following head manufacture, sliders are manufactured beginning in step 151 by slicing a wafer with a plurality of head assemblies into rows in step 151. The rows are processed in step 152 by, for example, polishing air bearing surfaces. Individual sliders are produced in step 153 by dicing rows. Each slider includes a head structure with an MR reproducing head. Beginning at step 154, disk drive sub-assemblies are manufactured. In this regard, the sliders are mounted to flexures to produce head suspension assemblies. The MR reproducing heads on the HSAs produced in step 154 have their magnetic state set in step 155 either individually, or in tray-level processing, according to the teachings given above. The HSA suspensions may then be degaussed in step 156, either singly or at tray level, as necessary. Last, in step 157, the HSAs and other sub-assemblies are integrated into disk drives.

The method and apparatus of the invention have been presented in the context of "reinitialization" because in the best mode and preferred embodiment of the invention, initialization of MR elements is done at either the wafer or the row level, or once at each of the levels proceeding the suspension level. The inventors do not intend to limit the invention to reinitialization and, in fact, contemplate that initialization in the manner discussed above can be postponed and performed only at the suspension level. Therefore, the invention can also be applied to the magnetic initialization of thin film magnetoresistive reproducing heads at the suspension level of media drive manufacturing.

Clearly, other embodiments and modifications of the present invention will occur readily to those of ordinary skill in the art in view of these teachings. Therefore, this invention is to be limited only by the following claims, which include all such embodiments and modifications.

We claim:

1. A method for setting a magnetic state of a magnetoresistive device using a magnetizing apparatus including an air gap disposed between magnetic poles composed of a soft magnetic material and means for inducing a magnetic field in the air gap, the method including the steps of:

forming a plurality of thin-film magnetoresistive transducers on a single substrate, each magnetoresistive transducer including a hard biased magnetoresistive element having a magnetic state;

separating the thin-film magnetoresistive transducers by cutting the single substrate into a plurality of individual pieces;

mounting each individual piece on a flexure, producing a head slider assembly;

for at least one head slider assembly, setting the magnetic state of a hard biased magnetoresistive element in a magnetoresistive transducer mounted on the flexure by disposing the head slider assembly with respect to the magnetizing apparatus to place the hard biased magnetoresistive element in the air gap; and inducing a magnetic field in the air gap.

2. The method of claim 1, wherein the setting step further includes, after inducing the magnetic field, the following steps:
removing the magnetic field from the air gap; and
moving the head slider assembly to remove the hard biased magnetoresistive element from the air gap.

3. The method of claim 1, wherein the magnetic field has a first orientation with respect to an initial direction of magnetization of the hard biased magnetoresistive element, the method further including the step of degaussing the head slider assembly by applying a decaying magnetic field to the head slider assembly, the decaying magnetic field having a field direction substantially orthogonal to the initial direction of magnetization of the hard biased magnetoresistive element.

4. The method of claim 1, wherein the setting step is performed substantially simultaneously on a plurality of hard biased magnetoresistive elements on a plurality of head slider assemblies.

5. The method of claim 1, wherein the setting step further comprises the following steps, in order:
removing the magnetic field from the air gap, followed by the additional step of removing the head slider assembly from the air gap.

6. The method of claim 5, wherein the setting step is performed substantially simultaneously on a plurality of hard biased magnetoresistive elements on a plurality of suspension assemblies.

7. A method for setting a magnetic state of a magnetoresistive device using a magnetizing apparatus including an air gap disposed between magnetic poles composed of a soft magnetic material and means for inducing a magnetic field in the air gap, the method including the steps of:
mounting a plurality of magnetoresistive transducers on a corresponding plurality of head slider assemblies, such that each magnetoresistive transducer includes a hard biased magnetoresistive element having a magnetic state and is mounted on a respective flexure; for at least one head slider assembly, setting the magnetic state of a hard biased magnetoresistive element in a magnetoresistive transducer mounted on the flexure by disposing the assembly with respect to the magnetizing apparatus to place the hard biased magnetoresistive element in the air gap;
inducing a magnetic field in the air gap; and
mounting the at least one assembly in a media drive.

8. The method of claim 7, wherein the setting step further includes, after inducing the magnetic field, the following steps:
removing the magnetic field from the air gap; and
moving the head slider assembly to remove the hard biased magnetoresistive element from the air gap.

9. The method of claim 7, wherein the magnetic field has a first orientation with respect to an initial direction of magnetization of the hard biased magnetoresistive element, the method further including the step of degaussing the head slider assembly by applying a decaying magnetic field to the head slider assembly, the decaying magnetic field having a field direction substantially orthogonal to the initial direction of magnetization of the hard biased magnetoresistive element.

10. The method of claim 7, wherein the setting step is performed substantially simultaneously on a plurality of hard biased magnetoresistive elements on a plurality of head slider assemblies.

11. The method of claim 7, wherein the setting step further comprises the following steps, in order:
removing the magnetic field from the air gap, followed by the additional step of removing the head slider assembly from the air gap.

12. The method of claim 11, wherein the setting step is performed substantially simultaneously on a plurality of hard biased magnetoresistive elements on a plurality of head slider assemblies.

13. A method for setting a magnetic state of a magnetoresistive device using a magnetizing apparatus including an air gap disposed between magnetic poles composed of a soft magnetic material and means for inducing a magnetic field in the air gap, the method including the steps of:
forming a plurality of thin-film magnetoresistive transducers on a single substrate, each magnetoresistive device including a magnetoresistive element having a magnetic state;
separating the thin-film magnetoresistive transducers by cutting the single substrate into a plurality of individual pieces;
mounting each individual piece on a flexure, producing a head slider assembly;
for at least one slider assembly, setting the magnetic state of a hard biased magnetoresistive element in a magnetoresistive transducer mounted on the flexure by disposing the assembly with respect to the magnetizing apparatus to place the hard biased magnetoresistive element in the air gap, the magnetic field having a strength in the range of 450 to 4500 gauss; and
inducing a magnetic field in the air gap.

14. The method of claim 13, wherein the setting step further includes, after inducing the magnetic field, the following steps:
removing the magnetic field from the air gap; and
moving the head slider assembly to remove the magnetoresistive element from the air gap.

15. The method of claim 13, wherein the magnetic field has a first orientation with respect to an initial direction of magnetization of the magnetoresistive element, the method further including the step of degaussing the head slider assembly by applying a decaying magnetic field to the assembly, the decaying magnetic field having a field direction substantially orthogonal to the initial direction of magnetization of the magnetoresistive element.

16. The method of claim 13, wherein the setting step is performed substantially simultaneously on a plurality of magnetoresistive elements on a plurality of head slider assemblies.

17. The method of claim 13, wherein the setting step further comprises the following steps, in order:
removing the magnetic field from the air gap, followed by the additional step of removing the head slider assembly from the air gap.

18. The method of claim 17, wherein the setting step is performed substantially simultaneously on a plurality of magnetoresistive elements on a plurality of head slider assemblies.

19. A method for setting a magnetic state of each magnetoresistive transducer of a plurality of magnetoresistive transducers using a magnetizing apparatus that includes a plurality of cell magnets including a corresponding cell magnet for each magnetoresistive transducer, each cell magnet further including an air gap disposed between a pole members that are composed of a soft magnetic material, and the apparatus further including means for inducing a magnetic field in the air gap, the method including the steps of:

forming a plurality of thin-film magnetoresistive transducers on a single substrate, each magnetoresistive transducer including a magnetoresistive element having a magnetic state;

separating the thin-film magnetoresistive transducers by cutting the single substrate into a plurality of individual pieces;

mounting each individual piece on a respective flexure, producing a head slider assembly from a plurality of assemblies;

for each assembly in the plurality of head slider assemblies, setting the magnetic state of each hard biased magnetoresistive element in each magnetoresistive transducer mounted on each flexure substantially simultaneously by disposing each assembly in each air gap of each cell magnet; and inducing a magnetic field in each air gap of each cell magnet.

20. The method of claim 19, further comprising the step of boosting magnetic field strength to counteract degradation of magnetic field strength in any cell magnet of the plurality of cell magnets:

providing a permanent magnet;

disposing the permanent magnet between pole members of adjacent cell magnets; and inducing a magnetic field to the permanent magnet to prevent leakage of adjacent cell magnets.

21. The method of claim 19, wherein the magnetic field has a strength in the range of 450 to 4500 gauss.

22. The method of claim 19, wherein the setting step further includes, after inducing the magnetic field, the following steps:

removing the magnetic field from the air gap; and moving the head slider assembly to remove the magnetoresistive element from the air gap.

23. The method of claim 19, wherein the magnetic field has a first orientation with respect to an initial direction of magnetization of the hard biased magnetoresistive element, the method further including the step of degaussing the head slider assembly by applying a decaying magnetic field to the assembly, the decaying magnetic field having a field direction substantially orthogonal to the initial direction of magnetization of the hard biased magnetoresistive element.

24. The method of claim 19, wherein the setting step further comprises the following steps, in order:

removing the magnetic field from each air gap, followed by the additional step of removing each head slider assembly from each air gap.

25. The method of claim 19, wherein the setting step further comprises the following steps, in order:

removing the magnetic field from each air gap, followed by the additional step of removing each suspension assembly.

26. The method of claim 21, wherein the setting step further includes, after inducing the magnetic field, the following steps:

removing the magnetic field from the air gap; and moving the head slider assembly to remove the magnetoresistive element from the air gap.

27. The method of claim 21, wherein the magnetic field has a first orientation with respect to an initial direction of magnetization of the hard biased magnetoresistive element, the method further including the step of degaussing the head slider assembly by applying a decaying magnetic field to the assembly, the decaying magnetic field having a field direction substantially orthogonal to the initial direction of magnetization of the hard biased magnetoresistive element.

28. The method of claim 21, wherein the setting step further comprises the following steps, in order:

removing the magnetic field from each air gap, followed by the additional step of removing each head slider assembly from each air gap.

29. A method for setting a magnetic state of each magnetoresistive transducer of a plurality of magnetoresistive transducers using a magnetizing apparatus that includes a plurality of cell magnets including a corresponding cell magnet for each magnetoresistive transducer, each cell magnet further including an air gap disposed between pole members that are composed of a soft magnetic material, and the apparatus further including means for inducing a magnetic field in the air gap, the method including the steps of:

mounting the plurality of magnetoresistive transducers on a corresponding plurality of flexures, producing a corresponding plurality of head slider assemblies, such that each magnetoresistive transducer includes a hard biased magnetoresistive element having a magnetic state and being mounted on a respective flexure;

for each assembly in the plurality of head slider assemblies, setting the magnetic state of each hard biased magnetoresistive element in each magnetoresistive transducer mounted on each flexure substantially simultaneously by disposing each assembly in each air gap of each cell magnet; and inducing a magnetic field in each air gap of each cell magnet.

30. A method for setting a magnetic state of each magnetoresistive transducer of a plurality of magnetoresistive transducers using a magnetizing apparatus that includes a plurality of cell magnets including a corresponding cell magnet for each magnetoresistive transducer, each cell magnet further including an air gap disposed between a pole members that are composed of a soft magnetic material, and the apparatus further including means for inducing a magnetic field in the air gap, the method including the steps of:

mounting the plurality of magnetoresistive transducers on a corresponding plurality of media drive suspension assemblies, such that each magnetoresistive transducer includes a hard biased magnetoresistive element having a magnetic state and being mounted on a respective media drive suspension assembly;

for each suspension assembly in the plurality of suspension assemblies, setting the magnetic state of each hard biased magnetoresistive element in each magnetoresistive transducer mounted on each suspension assembly substantially simultaneously by disposing each suspension assembly in each air gap of each cell magnet; and inducing a magnetic field in each air gap of each cell magnet.

31. The method of claim 30, further comprising the step of boosting magnetic field strength to counteract degradation of magnetic field strength in any cell magnet of the plurality of cell magnets:

providing a permanent magnet;

disposing the permanent magnet between pole members of adjacent cell magnets; and inducing a magnetic field to the permanent magnet to prevent leakage of adjacent cell magnets.

32. The method of claim 29, wherein the setting step further includes, after inducing the magnetic field, the following steps:

removing the magnetic field from the air gap; and moving the head slider assembly to remove the magnetoresistive element from the air gap.

33. The method of claim 29, wherein the magnetic field has a first orientation with respect to an initial direction of magnetization of the hard biased magnetoresistive element, the method further including the step of degaussing the head slider assembly by applying a decaying magnetic field to the head slider assembly, the decaying magnetic field having a field direction substantially orthogonal to the initial direction of magnetization of the hard biased magnetoresistive element.

34. The method of claim 29, wherein the setting step further comprises the following steps, in order:

removing the magnetic field from each air gap, followed by the additional step of removing each head slider assembly from each air gap.

35. The method of claim 30, wherein the setting step further comprises the following steps, in order:

removing the magnetic field from each air gap, followed by the additional step of removing each suspension assembly from each air gap.

36. The method of claim 31, wherein the setting step further includes, after inducing the magnetic field, the following steps:

removing the magnetic field from the air gap; and moving the head slider assembly to remove the magnetoresistive element from the air gap.

37. The method of claim 31, wherein the magnetic field has a first orientation with respect to an initial direction of magnetization of the hard biased magnetoresistive element, the method further including the step of degaussing the head slider assembly by applying a decaying magnetic field to the assembly, the decaying magnetic field having a field direction substantially orthogonal to the initial direction of magnetization of the hard biased magnetoresistive element.

38. The method of claim 31, wherein the setting step further comprises the following steps, in order:

removing the magnetic field from each air gap, followed by the step of removing each head slider assembly from each air gap.

* * * * *

UNITED STATES PATENT AND TRADEMARK OFFICE
CERTIFICATE OF CORRECTION

PATENT NO. : 5,664,319  
DATED : September 9, 1997  
INVENTOR(S) : Abboud, et al Page 1 of 2

It is certified that error appears in the above-identified patent and that said Letters Patent is hereby corrected as shown below:

Claim 7, Column 11, line 39, "for at least" starts a new paragraph.

Claim 25, Column 13, should be deleted and replaced with
--25. The method of claim 21, wherein the magnetic field to the permanent magnet is induced if the magnetic field strength of a cell magnet drops below about 450 gauss.--

Claim 30, Column 14, should be deleted and replaced with
--30. The method of claim 29 further comprising the step of boosting magnetic field strength to counteract degradation of magnetic field strength in any cell magnet of the plurality of cell magnets:
    providing a permanent magnet;
    disposing the permanent magnet between pole members of adjacent cell magnets; and
    inducing a magnetic field to the permanent magnet to prevent leakage of adjacent cell magnets.--

Claim 31, Column 14, should be deleted and replaced with
--31. The method of claim 29, wherein the magnetic field has a strength in the range of 450 to 4500 gauss.--

UNITED STATES PATENT AND TRADEMARK OFFICE
CERTIFICATE OF CORRECTION

PATENT NO. : 5,664,319

DATED : September 9, 1997

INVENTOR(S) : Abboud, et al

It is certified that error appears in the above-identified patent and that said Letters Patent is hereby corrected as shown below:

Claim 35, Column 15, should be deleted and replaced with --The method of claim 29, wherein the magnetic field to the permanent magnet is induced if the magnetic field strength of a cell magnet drops below about 450 gauss.--

Signed and Sealed this

Third Day of March, 1998

Attest:

BRUCE LEHMAN

Attesting Officer

Commissioner of Patents and Trademarks